April 13, 1948.                S. J. LANZALOTTI ET AL                2,439,394
                              GROMMET INSULATING BUSHING UNIT
                                     Filed July 4, 1945

INVENTOR.
MAX SKOBEL
BY    SAMUEL J. LANZALOTTI

William D. Hall.
ATTORNEY

Patented Apr. 13, 1948

2,439,394

UNITED STATES PATENT OFFICE 2,439,394

GROMMET INSULATING BUSHING UNIT

Samuel J. Lanzalotti, Williamstown, and Max Skobel, Eatontown, N. J., assignors to the United States of America as represented by the Secretary of War Application July 4, 1945, Serial No. 603,245

1 Claim. (Cl. 174—153)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to bushings for electrical equipment, and more particularly, to a grommet type device of this nature, suitable for permanent assembly on a plate or cover.

In the prior art, especially for the small type of transformer assemblies, the leads have been brought through holes in the metal casing and insulated from the metal with tape, a loose bushing, or by the employment of a heavy insulating cover on the wire, itself. The disadvantages of these arrangements were in the fact that wear during working operations deteriorated the tape, bushing, or insulation, and caused it to break down, resulting in electrical damage to the equipment.

In the present invention, it is an object to provide a new and improved grommet insulating bushing unit that will avoid one or more of the disadvantages and limitations of the prior art.

An additional object of this invention is to provide a new and improved grommet insulating bushing that will be effective, economical to install, neat in appearance, strong enough to take rough treatment, have low maintenance requirements, convenient to assemble, capable of being made watertight, if desirable, and not affected by heat within usual working ranges.

In a particular form of the invention, a grommet insulating bushing unit comprises a sleeve of flexible insulating material arranged for insertion through and to contact with both sides of a plate. It includes a rigid insulating bushing for placement against said sleeve. It also has a fastening post passing through the sleeve and bushing, so as to be insulated from the plate, and adapted to have portions swaged over after assembly to compress the bushings against the sleeve, to spread same against the plate. The post is arranged for the attachment of electrical conductors thereto.

For a better understanding of the present invention, together with other and further objects thereof, reference is had to the following description taken in connection with the accompanying drawings, which are used to illustrate a particular form of the invention, and its scope will be pointed out in the appended claim.

Referring to the drawing.

Similar reference characters refer to similar parts throughout the drawing.

Figures 1, 2:
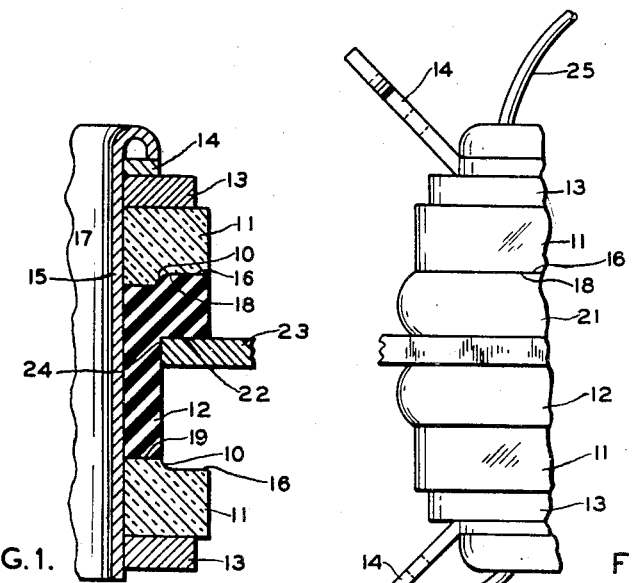
Figure 1 is a side view of a grommet insulating bushing unit embodying in this invention, assembled to a plate.
Figure 2 is a side view partly in section through the unit and plate before grommeting.

In the construction indicated in this illustration of the invention, there are several main separable parts. These are termed the rigid, hollow, ceramic bushings 11; the flexible, hollow, intermediate sleeve 12, of relatively soft and resilient material; the external washers 13, preferably of metal; the eyelet terminal 14, and the tubular central fastening post 15. In a more specific description, each bushing 11 is cylindrical, with a raised nodule 10 of circular form around the axis portion on end face 16, thereof. It has a central, circular passage 17 for a wire 25 to go through. The bushings are located against the upper and lower end faces 18 and 19, respectively, of the intermediate grommet sleeve 12. The grommet sleeve 12 is cylindrical with an enlarged upper shoulder 21, having its under-surface 22 flat and adapted to rest on a plane or plate 23, on which the device is to be assembled. The body of the grommet sleeve fits through a hole 24 in the plate, and its whole structure appears as in Fig. 1, before being compressed to the grommet form shown in Fig. 2. The washers 13 are placed against the outer surfaces of the bushings, and through all these parts the fastening post 15 is inserted, and the wall of its tube is then swaged over in a grommet manner with the eyelet terminal at one side of the plate, but insulated therefrom by the bushings and intermediate sleeve.

In actual use, the plate is on a casing containing a transformer or other suitable apparatus, with a lead conductor 26 of the latter brought and coupled to the lower eyelet terminal 14. Another conductor 25 is also connected to the same terminal and brought through the tube 15 to be carried to some outside equipment. It can be readily appreciated that the fact that the tube is metal and a conductor will not jeopardize the insulating requirements between it and the plate, since the space in between is amply insulated by the bushing and sleeve. It is not necessary to carry a wire through the tube, but simply provide an eyelet terminal on both ends of the tube and employ the latter as the intervening conductor.

Figure 3:
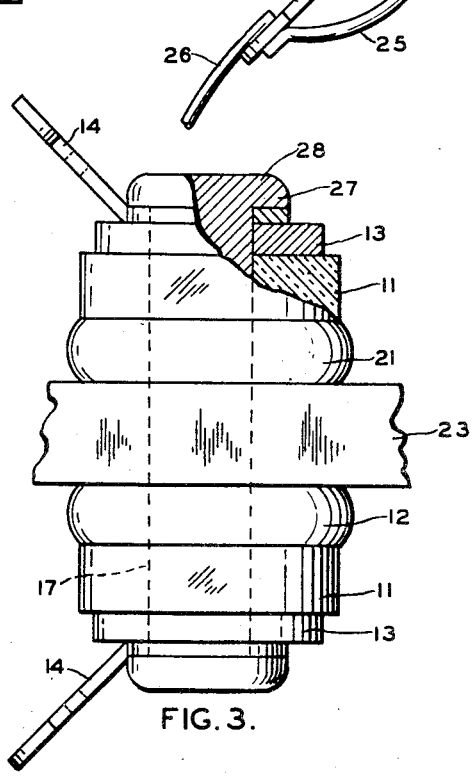
Figure 3 is a modified form of the grommet unit.

In the modification shown in Fig. 3, the tube is replaced by a solid metal rod 28, so as to keep the bushing water and airtight, and the rod, itself, acts as a solid conductor between the eyelet terminals on both ends. The ends of portions 27 of the rod post are swaged over, as in the original form, to compress the bushings against the sleeve, cause the latter to extrude radially and fill the space without the hole 24 of the plate 23, and form a rigid mechanical connection to the plate capable of withstanding severe usage, while at the same time forming a cushion and preventing expense and effort due to maintenance.

While there has been described what is at present considered to be a preferred embodiment of this invention, it will be obvious to those skilled in the art that various changes and further modifications may be made therein without departing from the spirit of the invention or the principles thereof. It is, therefore, intended in the appended claim to cover all such changes and modifications as fall within the true spirit and scope of the invention.

What is claimed is:

In a bushing unit for passing an electrical lead through an opening in a plate of conducting material and insulating said lead from said plate, the combination of a unitary sleeve of elastic insulating material, said sleeve comprising a tubular body having an outside diameter to allow it to be slidably inserted into said opening and to make a snug fit therein and a shoulder extending radially outwardly from said body at one end thereof to allow it to abut one surface of said plate, the other end of said body being of greater longitudinal dimension than the longitudinal dimension of said shoulder so that, upon longitudinal compression of the sleeve, the unshouldered end of the body may be expanded radially outwardly so as to be of substantially the same size and configuration as the said shoulder and so as to abut the other surface of said plate, two tubular bushings of rigid insulating material coaxial with said sleeve and positioned at opposite ends respectively of said sleeve and of greater outside diameter than the inside diameter of the opening in the plate so that said bushings may not pass through said opening, two annular eyelet terminals of conducting material coaxial with said sleeve and bushings and abutting the outer surfaces respectively of said bushings, the inside diameters of said sleeve, bushings and terminals being substantially alike, a grommet-type post extending through said sleeve, bushings and eyelets and being of a length to press said terminals toward each other against said bushings and to press said bushings toward each other and thereby compress said sleeve longitudinally so as to expand the unshouldered end of the body radially outwardly to substantially the size and configuration of the shoulder and to press said expanded portion against one surface of said plate and to press the shoulder against the other surface thereof so as to tightly grip said plate therebetween and to insulate the post and terminals from said plate and to act as a vibration isolator.

SAMUEL J. LANZALOTTI.
MAX SKOBEL.

REFERENCES CITED

The following references are of record in the file of this patent:

UNITED STATES PATENTS

| Number | Name | Date |
|---|---|---|
| 726,651 | Cullen | Apr. 28, 1903 |
| 965,684 | Bierce et al. | July 26, 1910 |
| 1,346,539 | Gray | July 13, 1920 |
| 1,852,454 | Foster | Apr. 5, 1932 |
| 2,017,204 | Fisher et al. | Oct. 15, 1935 |
| 2,052,700 | De Lange | Sept. 1, 1936 |
| 2,167,286 | Theobald | July 25, 1939 |
| 2,307,561 | Bailey | Jan. 5, 1943 |
| 2,368,548 | Kalstein | Jan. 30, 1945 |